United States Patent [19]

Hui et al.

[11] Patent Number: 5,488,419

[45] Date of Patent: Jan. 30, 1996

[54] VIDEO COMPRESSION CODING AND DECODING WITH AUTOMATIC SUB-PIXEL FRAME/FIELD MOTION COMPENSATION

[75] Inventors: Lucas Y. W. Hui; Siew-Tan Chong, both of Singapore, Singapore

[73] Assignee: Matsushita Electric Industrial Co., Ltd., Osaka, Japan

[21] Appl. No.: 31,495

[22] Filed: Mar. 15, 1993

[30] Foreign Application Priority Data

Mar. 13, 1992 [JP] Japan ..................................... 4-054935

[51] Int. Cl.$^6$ ............................ H04N 7/133; H04N 7/137
[52] U.S. Cl. ............................ 348/402; 348/417; 348/699
[58] Field of Search .................................. 358/136, 133, 358/105, 135; 348/699, 402, 407, 409, 413, 416, 451–452; H04N 7/133, 7/137

[56] References Cited

U.S. PATENT DOCUMENTS

| | | | |
|---|---|---|---|
| 3,890,462 | 6/1975 | Limb et al. | 348/135 |
| 4,546,386 | 10/1985 | Matsumoto et al. | 348/412 |
| 4,661,849 | 4/1987 | Hinman | 358/136 |
| 5,005,076 | 3/1991 | Stroppiana et al. | 358/136 |
| 5,073,820 | 12/1991 | Nakagawa et al. | 358/133 |
| 5,093,720 | 3/1992 | Krause et al. | 358/135 |
| 5,150,432 | 9/1992 | Ueno et al. | 358/136 |

FOREIGN PATENT DOCUMENTS

| | | | |
|---|---|---|---|
| 0472239 | 2/1992 | European Pat. Off. | H04N 5/14 |
| 2604049 | 3/1988 | France | H04N 11/00 |
| 0137379 | 8/1983 | Japan | 358/136 |
| 2236449 | 4/1991 | United Kingdom | H04N 5/14 |

OTHER PUBLICATIONS

Signal Processing of HDTV, II 1989, Turin, IT, pp. 131–137 XPOOO215234, Ziegler, "Hierarchical Motion Estimation Using The Phase Correlation Method In 140 MBIT/S HDTV–Coding".

Fujitsu–Scientific and Technical Journal, vol. 22, No. 4, 1986, Kawasaki JP pp. 335–366, Tsuda et al., "Efficient Video Bandwidth Compression".

"Proposal Package", ISO–IEC/JTC1/SC29/WG11, MPEG 91/228, 1991.

Primary Examiner—Tommy P. Chin
Assistant Examiner—Vu Le
Attorney, Agent, or Firm—Wenderoth, Lind & Ponack

[57] ABSTRACT

An input frame to be motion compensated is partitioned into smaller blocks of pixel data. First, motion estimation is performed on each block in full-pixel resolution. Then, full-pixel resolution motion vector is refined to half-pixel accuracy by searching the surrounding half-pixel resolution blocks in vertical and horizontal positions with respect to the full-pixel resolution motion vector. An absolute magnitude of a horizontal component of the full-pixel resolution motion vector is examined to see if it is greater or less than a predetermined threshold to detect any significant movement. If the horizontal component absolute magnitude is less than the threshold, a frame-based interpolation will be used for forming the sub-pixel resolution block. If the horizontal component absolute magnitude is greater than the threshold, a field-based interpolation will be used instead. The sub-pixel resolution block is subjected to motion estimation and compensation to obtain a predicted block which will then be coded to obtain a coded bit stream.

16 Claims, 5 Drawing Sheets

VIDEO COMPRESSION CODING AND DECODING WITH AUTOMATIC SUB-PIXEL FRAME/FIELD MOTION COMPENSATION

BACKGROUND OF THE INVENTION

1. Field of the Invention

This invention relates to compression coding and decoding of high quality interlaced scan video signals for digital storage and transmission media.

2. Description of the Prior Art

The bandwidth compression of video signal has recently attracted many active research and standardization efforts. Various techniques have been explored for the digital coding of various video signal formats at different bit rates.

In terms of the techniques of for obtaining the video sequence sources from recording devices and later refreshing on display devices, video sequences can be classified into two types: the progressive scan video sequence and the interlaced scan video sequence. In a progressive scan video sequence, a frame in the sequence is captured and refreshed sequentially line by line from the top to bottom of the frame. In an interlaced scan video sequence, a frame consists of two fields, the even field made up of the even lines of the frame and the odd field made up of the odd lines of the frame. Capturing and refreshing are performed first on the even field, sequentially from the top to bottom of the field, and followed by the odd field in the same manner. Since a large number of the present sequence sources are in the interlaced scan format (e.g. NTSC, PAL), an increasing number of research efforts have been directed towards the efficient coding of the interlaced scan video sequence.

Video bandwidth compression is done by reducing the temporal, spatial and statistical redundancy in a video sequence. To reduce the temporal redundancy, motion estimation and compensation is used. According to the prior art, in motion estimation and compensation (e.g. the MPEG Video Simulation Model Three, International Organization for Standardization, Coded Representation of Picture and Audio Information, 1990, ISO-IEC/JTC1/SC2/WG8 MPEG 90/041), the frames, which can also be referred to as pictures, in an interlaced scan video sequence can be classified into two types: (1) intra-coded frames in which each frame is coded using information only from itself; (2) predictive-coded frames in which each frame is coded using motion compensated prediction from a past intra-coded or predictive-coded frame or/and a future intra-coded or predictive-coded frame.

Each frame in the sequence is first partitioned into blocks of pixel data which are then processed by a block coding method such as discrete cosine transform (DCT) with or without motion compensation. For a predictive-coded frame, the blocks are coded with motion compensation using information from an adjacent frame by block matching motion estimation and compensation to predict the contents of the coded frame. The block matching algorithm used consists of determining the direction of translatory motion of the blocks of pixels from one frame to the next by finding the best matching block based on some pre-determined criteria. The differences between the best matching block and the actual block of pixels are then subjected to transformation (e.g. DCT) and quantization based on a quantization matrix and quantization steps given by a rate-controller, and run-length encoding of the quantized DCT coefficients. FIG. 1 is a block diagram describing the method proposed by MPEG. Detailed description of the method can be found in the document "MPEG Video Simulation Model Three (SM3)", ISO-IEC/JTC1/SC2/WG8, MPEG 90/041, 1990.

So that the decoder can use the best matching block for performing motion compensation, each block of pixels has an associated motion vector to indicate the location of the best matching block in the adjacent frame. The motion vector is a pair of numbers indicating the x and y offset of the block's location in the adjacent frame, with reference to the current block's location. For example, a motion vector of (3, 2) means that the best match for the current block can be found in the adjacent frames at the location +pixel to the right and +2 pixel below the current block's location. If all the motion vectors used for motion compensation are integer values, the motion vectors are called full-pixel resolution motion vectors, and the searching process for these full-pixel resolution motion vectors is called full-pixel search. In order to obtain a more accurate block from the adjacent frame for compensation, a sub-pixel resolution motion vector may be obtained. The sub-pixel resolution motion vector has non-integer values and points to a location in between the full-pixel location. The block to be used for compensation is then interpolated by using the pixels around it. One common example of the sub-pixel resolution motion vector is the half-pixel resolution motion vector. The half-pixel resolution motion vector may have values ±0.5, ±1.5, ±2.5, . . . The search for the half-pixel resolution motion vector usually follows after the full-pixel search such that the half-pixel is searched around the location indicated by the full-pixel resolution motion vector. The half-pixel resolution motion vector indicates that the best matching block of the adjacent frame comes from a half-pixel resolution block. This half-pixel resolution block can be obtained from the adjacent frame in two different ways, considering the interlace structure of the sequence, resulting in a frame-based interpolation mode and a field-based interpolation mode.

FIG. 2a illustrates the method of obtaining the half-pixel resolution motion vector in the frame-based interpolation mode.

In FIG. 2a:

Legend

P0 to P8: pixel value in full pixel position

H1 to H8: pixel value in half pixel position

Frame-based interpolation formulae $H1=(P0+P1+P2+P4)/4$ $H2=(P0+P2)/2$ $H3=(P0+P2+P3+P5)/4$ $H4=(P0+P4)/2$ $H5=(P0+P5)/2$ $H6=(P0+P4+P6+P7)/4$ $H7=(P0+P7)/2$ $H8=(P0+P5+P7+P8)/4$. In FIG. 2a, P0 to P8 are pixels of the adjacent frame in the full-pixel positions, i.e., they are the original non-interlaced pixels. In the frame-based interpolation mode, these pixels are treated without taking into account which field they come from. P0 is assumed to be the location pointed to by the full-pixel resolution motion vector (the full-pixel resolution vector is shown by the arrow formed of a solid line), and H1 to H8 the top left corners of the half-pixel resolution blocks (the corresponding half-pixel resolution vectors are shown by the arrows formed of a dashed line). One of these will give the best matching half-pixel resolution block. The best matching half-pixel resolution block is then compared with the block obtained using the full-pixel resolution motion vector (i.e., block with top left corner at P0), and the one that gives the best performance will be chosen as the block for motion compensation., As shown in FIG. 2a, depending on their locations, the half-pixel values are obtained by taking the average of the two adjacent pixels or the average of the four adjacent pixels. To form a half-pixel resolution block of size 8×8, 8 rows and 8 columns of the pixels need to be interpolated.

FIG. 2b shows the field-based interpolation mode.

In FIG. 2b:

Legend

E0 to E8: pixel value in full pixel position (from even field)

O0 to O8: pixel value in full pixel position (from odd field)

HE1 to HE8: pixel value in half pixel position (for even field)

HO1 to HO8: pixel value in half pixel position (for odd field)

Field-based interpolation formulae

HE1=(E0+E1+E2+E4))/4

HE2=(E0+E2)/2

HE3=(E0+E2+E3+E5)/4

HE4=(E0+E4)/2

HE5=(E0+E5)/2

HE6=(E0+E4+E6+E7)/4

HE7=(E0+E7)/2

HE8=(E0+E5+E7+E8)/4

HO1=(O0+O1+O2+O4)/4

HO2=(O0+O2 )/2

HO3=(O0+O2+O3+O5)/4

HO4=(O0+O4)/2

HO5=(O0+O5)/2

HO6=(O0+O4+O6+O7)/4

HO7=(O0+O7)/2

HO8=(O0+O5+O7+O8)/4. In FIG. 2b, E0 to E8 are pixels of the adjacent frame coming from the even field. If the full-pixel resolution motion vector points to the even field, for example E0, the half-pixel resolution motion vector will be obtained from one of the positions HE1 to HE8. Similar to the frame-based interpolation mode, HE1 to HE8 are also the top left corners of the half-pixel resolution blocks. Each half-pixel resolution block is formed with reference to the field pixel positions by taking the average of the two or four pixel values from the same field. The best matching half-pixel resolution block is then compared with the block obtained using the full-pixel resolution motion vector (i.e., block with top left corner at E0), and the one that gives the best performance will be chosen as the block for motion compensation. The same procedure is applied if the full-pixel resolution motion vector points to the odd field, O0.

Due to a time difference between the two fields of the frame, motion of the objects in an interlaced sequence will cause the objects to be displaced from one field to the other. In such a case, the field-based interpolation mode will give a better motion estimation with half pixel accuracy compared with the frame-based interpolation mode.

In order to determine the best half-pixel resolution motion vector for the coded block in the motion estimation process, both the frame-based and field-based interpolations need to be performed to obtain all half-pixel resolution blocks, and followed by a comparison based on some pre-defined criteria, such as mean absolute error, to determine which mode and which half-pixel position would give a minimum error for the coded block. With this method, the information of which of the frame interpolation mode and the field interpolation mode is being selected has to be transmitted to the decoder. An example of the implementation of the above method is described in the document "Proposal Package," ISO-IEC/JTC1/SC29/WG11, MPEG 91/228, 1991.

The above-described method of adaptive frame/field interpolation for sub-pixel motion estimation has several problems. In order to obtain the sub-pixel resolution motion vector, sub-pixel resolution blocks of frame-based interpolation and also field-based interpolation need to be obtained for comparison and this is costly in hardware implementation. Secondly, to use this method, extra information (bit) needs to be transmitted to the decoder for each coded block so that the decoder uses the corresponding correct frame or field interpolation mode for sub-pixel motion compensation. With frame/field sub-pixel resolution block comparison using mean absolute error criteria, a visually smooth sub-pixel motion estimation was found difficult in some cases.

SUMMARY OF THE INVENTION

An object of the present invention is to provide a video compression coding/decoding method which provides an effect of better reconstructed picture quality.

Another object of the present invention is to provide a video compression coding/decoding method efficiently performing motion estimation and compensation.

Still another object of the present invention is to provide an automatic adaptation of field-based and frame-based methods to different regions in an input frame.

A further object of the present invention is to provide a video compression coding/decoding method in which no extra information needs to be transmitted from an encoder to a decoder and hence a reduction of bit-rate can be achieved.

A still further object of the present invention is to provide a video compression coding/decoding method in which computation time for the search of the half-pixel resolution motion vector can be reduced.

Yet another object of the present invention is to provide a video compression coding/decoding method which provides a better prediction for the block to be coded.

To achieve the above objects, a method according to the present invention automatically selects the frame-based or field-based mode to form the sub-pixel resolution block for motion estimation and compensation. This method is based on the fact that stationary regions in a frame have high spatial correlation between adjacent lines and that regions corresponding to the moving objects have higher correlation within each field compared to that of the adjacent lines. In this method, an input frame to be motion compensated is partitioned into smaller blocks of pixel data. As a first step, motion estimation is performed on each block in the full-pixel resolution using a reference frame. In a second step, the detected full-pixel resolution motion vector is then refined to half-pixel accuracy by further searching the surrounding half-pixel resolution blocks in the vertical and horizontal position with respect to the full-pixel resolution motion vector using the reference frame. In this step, the absolute magnitude of a horizontal component of the full-pixel resolution motion vector is examined to see if it is greater or less than a predetermined threshold to detect any significant movement. If the horizontal component absolute magnitude is less than the threshold, the frame-based interpolation mode will be used for forming the sub-pixel resolution block. Whereas if the horizontal component absolute magnitude is greater than the threshold, the field-based interpolation mode will be used instead.

In this way, instead of forming both the frame-based and field-based interpolation mode sub-pixel blocks, only one of them may be formed. As the motion vector is examined to select either the frame-based interpolation or the field-based interpolation, no extra bit need to be transmitted to the decoder for the decoder to decide which of the frame-based or field-based interpolation modes should be used to obtain a predicted block for compensation.

With the above-mentioned methods, blocks with high motion, detected by the magnitude of the horizontal component of its motion vector, will be estimated and then compensated using the field-based method of forming the half-pixel resolution blocks. Blocks with little motion will be estimated and then compensated using the frame-based method of forming the half-pixel resolution blocks. The difference between the block to be coded and the predicted block is then processed using the conventional block coding techniques such as the DCT followed by quantization and run-length and variable length coding.

By the above automatic adaptation of field-based or frame-based interpolation methods to different regions in an input frame, two advantages can be realized. First, no extra information needs to be transmitted to the decoder and hence a reduction of bit-rate can be achieved. Second, computation time for the search of the half-pixel resolution motion vector can be reduced since either the frame-based or field-based interpolation may be computed, not both. The sub-pixel resolution block is also better represented compared to the method which uses solely the frame-based interpolation or solely the field-based interpolation and hence provides a better prediction for the block to be coded.

In general, the level of correlation within each picture frame in a video sequence differs between a stationary scene and a turbulent scene. Therefore, the present invention provides a method of more efficiently adapted to these two different scenes during the motion estimation and compensation process. In a fixed bit-rate video coding system, the present invention provides an effect of better reconstructed picture quality.

BRIEF DESCRIPTIONS OF THE DRAWINGS

DESCRIPTION OF THE PREFERRED EMBODIMENTS

Figure 1:
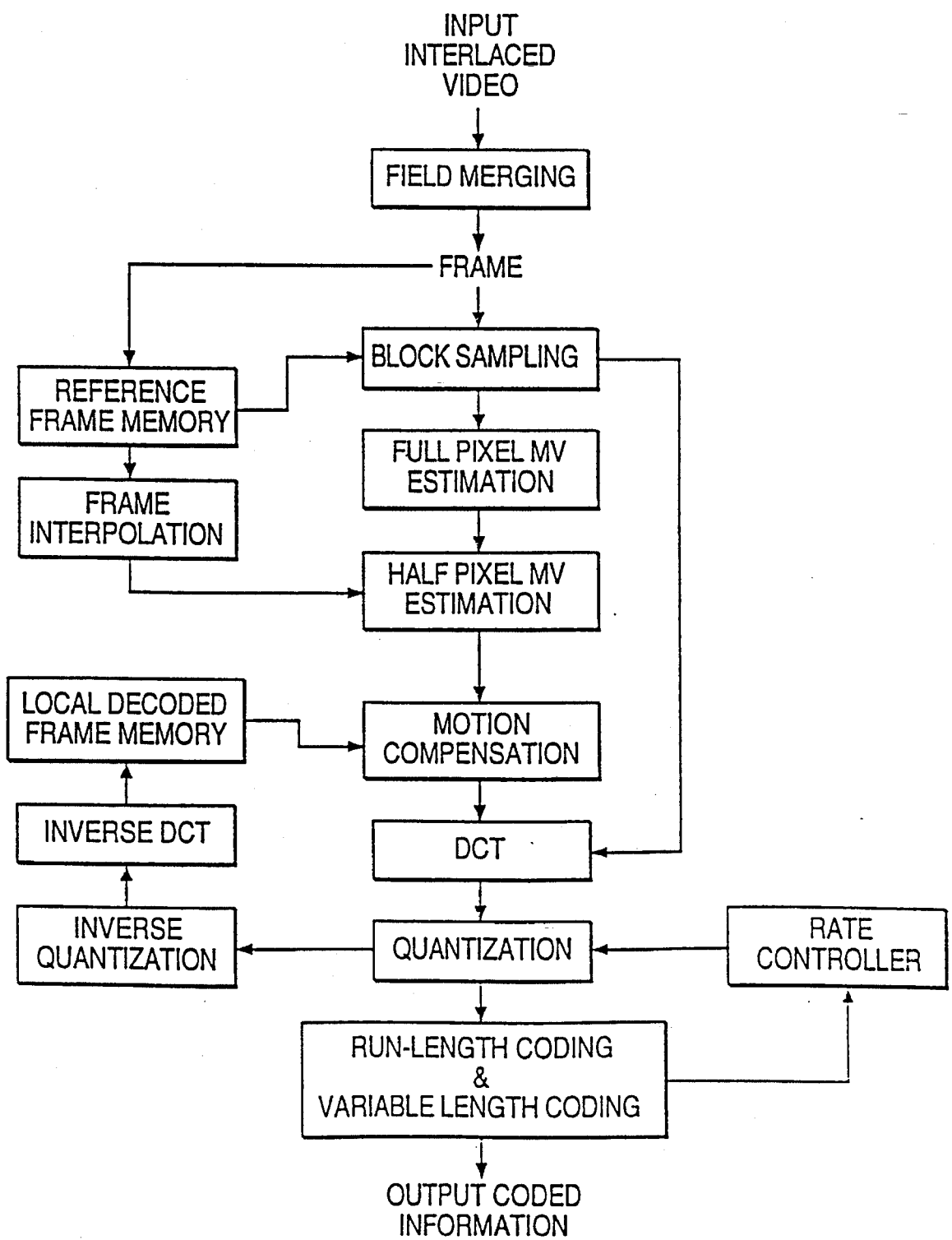
FIG. 1 is a block diagram illustrating the SM3 coding algorithm of the prior art.
Figure 2A:
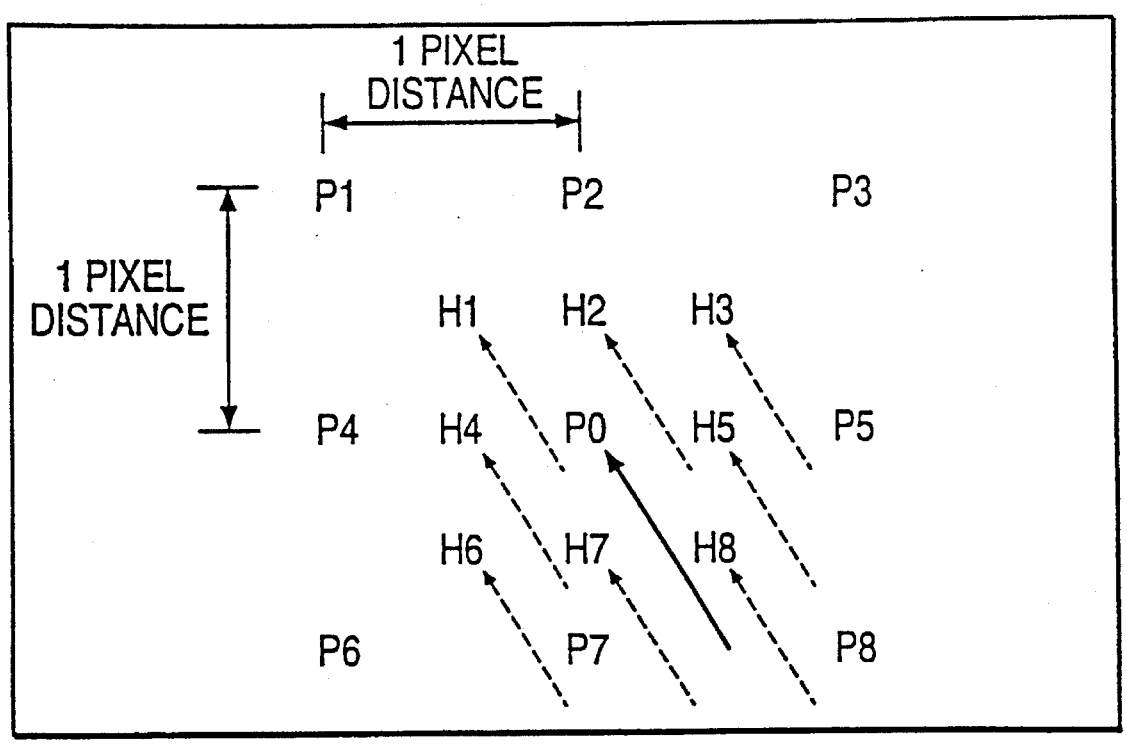
FIG. 2a is an illustration of frame-based half-pixel interpolation.
Figure 2B:
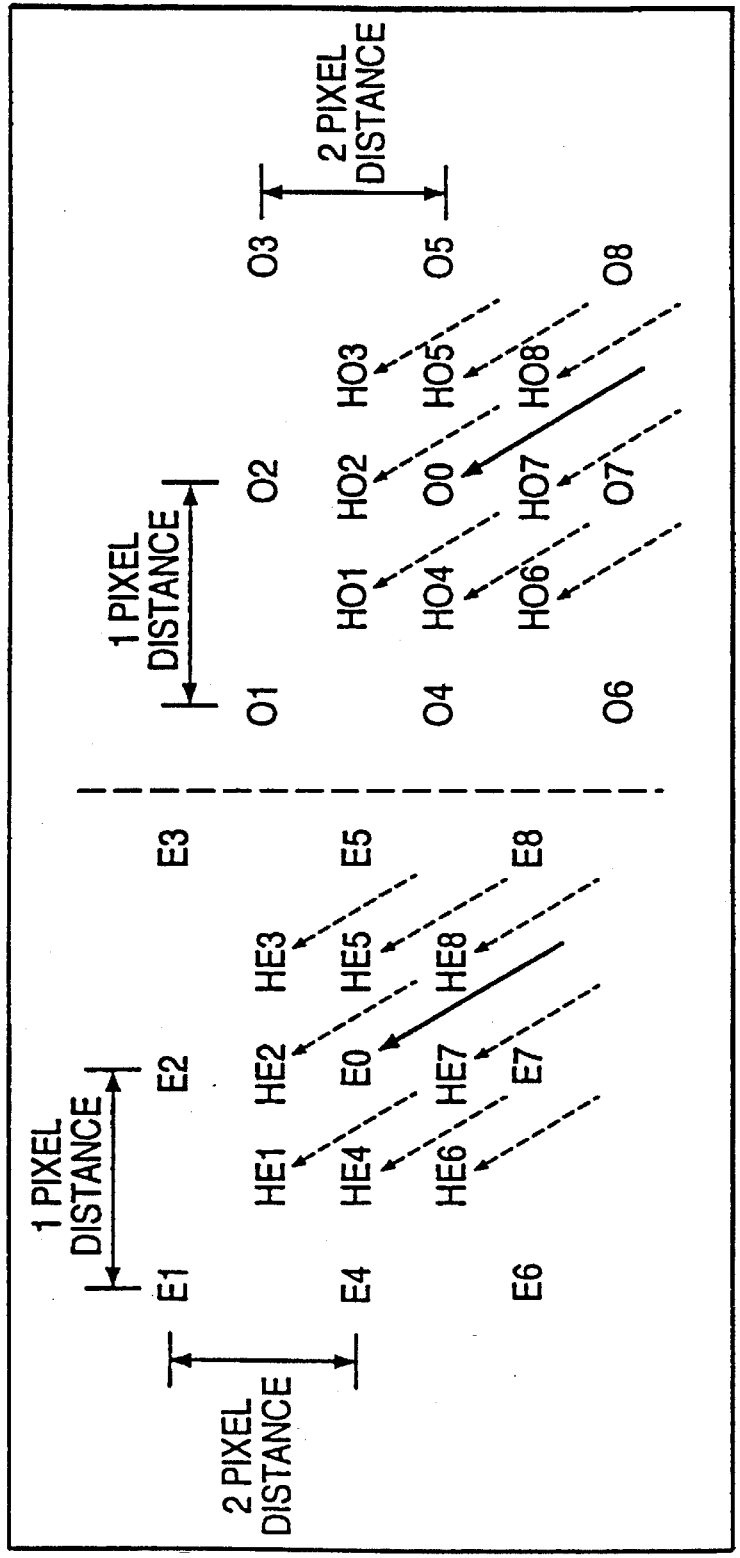
FIG. 2b is an illustration of field-based half-pixel interpolation.
Figure 3:
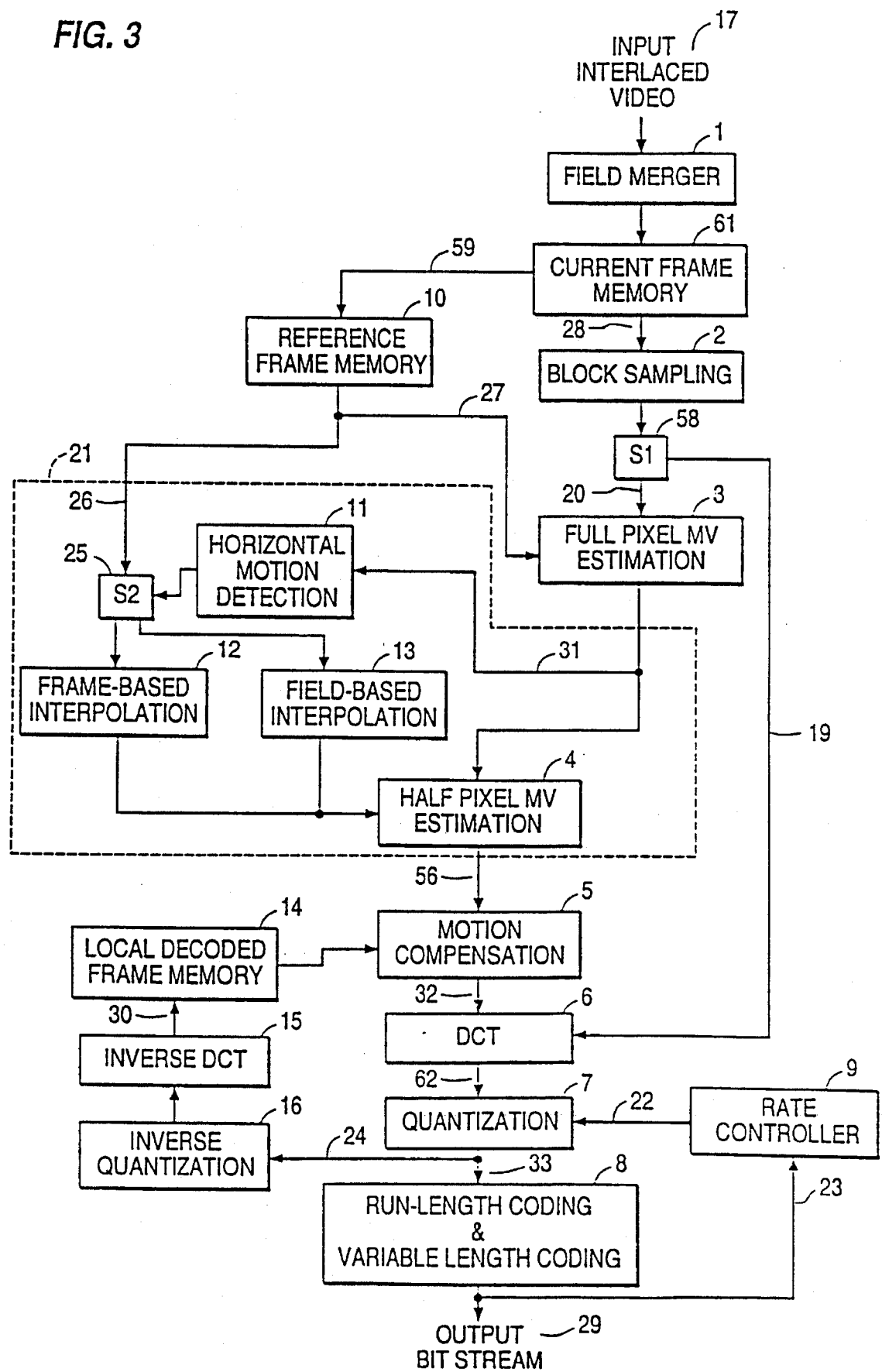
FIG. 3 is a block diagram of an encoder with automatic sub-pixel frame/field motion compensation which is a preferred embodiment of the present invention.

FIG. 3 shows a block diagram of an encoder as a preferred embodiment of the present invention. An input interlaced video signal 17 contains pixel data of two fields for each picture. The two field data are merged in a field merger 1 to form pixel data of a frame. The frame data are stored in a current frame memory 1. The frame data stored in the current frame memory 1 are then passed through a line 59 to a reference frame memory 10 to be stored therein. The frame data stored in the reference frame memory 10 will be used as reference data in the later described motion estimation process. There are two modes of processing data of a frame: an intra-coded mode in which each frame is coded using information only from itself; and a predictive-coded mode in which each frame is coded using motion compensation prediction from a past intra-coded or predictive-coded frame or/and a future intra-coded or predictive-coded frame. Most of the frames will be coded using the predictive-coded mode to reduce the temporal redundancy. Intra-coded frames are used periodically in the video sequence to support some other functions of video play like fast forward, fast reverse, random access and to give error robustness. The decision whether a frame is to be intracoded or predictive-coded is made according to the number (or position) of the frame in the sequence of the video signal. The number (or position) of the frame to be intra-coded is predetermined. For example, if it has been pre-determined to have one intra-coded frame for every fifteen frames, (n+1)th frames (where n=0, 1, 2, . . .), i.e., first, 16th, 32nd, . . . frames will be intra-coded and the rest will be predictive-coded.

A block sampling circuit 2 receives the data stored in the current frame memory 1 through a line 27 and partitions the frame data into spatially non-overlapping blocks of pixel data. To provide a reasonable level of adaptiveness, a block size of 8×8 pixels may be used. The frame number of the frame is also stored in the current frame memory 61 and passed through the block sampling circuit 2 to a switch (S1) 58. Based on the frame number, the switch 58 selectively delivers the output blocks of pixel data from the block sampling circuit 2 to a line 19 for a process in the intra-coded mode or to a line 20 for a process in the predictive-coded mode.

For the intra-coded mode, the output of the block sampling circuit 2 is passed through the line 19 to a discrete cosine transform (DCT) circuit 6. The DCT circuit 6 performs discrete cosine transform, which is a popular mathematical transformation for converting image data to data in the frequency domain. The transformed data, i.e., DCT coefficients, are then subjected to the process of quantization in a quantization circuit 7 using a quantizer matrix and a quantizer step size which is given by a rate controller 9 through a line 22. The quantized data are passed, together with the quantizer step as side information, through a line 33 to a run-length coding & variable length coding circuit 8. The run-length coding & variable length coding circuit 8 performs run-length coding of the quantized data and the associated side information followed by variable length coding of the run-length coded result. The output of the run-length coding & variable length coding circuit 8 is a coded bit stream 29 ready to be transmitted to the decoder. This bit stream is also passed through a line 23 to the rate controller 9. Based on the number of bits already used at the time of encoding the block, the rate controller 9 adjusts the quantizer step so that the output bit stream 29 satisfies the bit rate requirement of the encoder system. The quantized values obtained by the quantization circuit 7 are passed also through a line 24 to an inverse quantization circuit 16 and an inverse discrete cosine transform (inverse DCT) circuit 15. The inverse quantization circuit 16 performs the reverse process of quantization performed by the quantization circuit 7, and the inverse DCT circuit 15 performs the reverse process of the discrete cosine transform performed by the DCT circuit 6 to obtain reconstructed data. The reconstructed data is stored in a local decoded frame memory 14 through a line 30, and will be used for the motion compensation process of the next input frame.

For the predictive-coded mode, the output of the block sampling circuit 2 is passed through the line 20 to a full-pixel motion vector (MV) estimation circuit 3. In the full-pixel MV estimation circuit 3, motion vector estimation in the full-pixel resolution is performed to determine full-pixel resolution motion vectors from the original adjacent frame using reference frame data stored in the reference frame memory 10 obtained through a line 27. The full-pixel MV estimation circuit 3 finds the closest match by, for example, determining the direction of translatory motion of the blocks of pixels from one frame to the next by finding the best matching block based on some predetermined criteria, such as mean square error. The full-pixel MV estimation circuit 3 outputs the obtained full-pixel resolution motion vectors together with the blocks of pixels to be coded which have been supplied from the block sampling circuit 2 through the line 20.

After the full-pixel resolution motion vectors are obtained, half-pixel resolution motion vectors will be obtained in an interpolation unit 21. Each full-pixel resolution motion vector outputted from the full-pixel MV estimation circuit 3 is passed through a line 31 to a horizontal motion detection circuit 11. The horizontal motion detection circuit 11 examines to see if the absolute value of the horizontal component of the full-pixel resolution motion vector (horizontal motion vector) is greater or less than a pre-defined threshold to detect any significant movement. A horizontal motion vector having an absolute value greater than the pre-defined threshold means a significant movement for the block of data. The result of this is used to control a switch (S2) 25 to select a frame-based interpolation or a field-based interpolation. If the absolute value (magnitude) of the horizontal motion vector is less than the pre-defined threshold, the switch 25 selects a frame-based interpolation circuit 12 which performs the frame-based interpolation to form a half-pixel resolution block. Whereas if the absolute value of the horizontal motion vector is greater than the pre-defined threshold, the switch 25 selects a field-based interpolation circuit 13 which performs the field-based interpolation to form a half-pixel resolution block. The reference block data used for the interpolation in each of the interpolation circuits 12 and 13 is obtained from the reference frame memory 10 through a line 26.

A half-pixel motion vector (MV) estimation circuit 4 receives the half-pixel resolution blocks outputted from the frame-based interpolation circuit 12 or the field-based interpolation circuit 13 and the full-pixel resolution motion vectors and the blocks to be coded which are outputted from the full-pixel MV estimation circuit 3. The half-pixel MV estimation circuit 4 performs motion vector estimation in the half-pixel resolution by using the full-pixel resolution motion vectors and the half-pixel resolution blocks to determine half-pixel resolution motion vectors. Half-pixel resolution motion vectors surrounding a full-pixel resolution motion vector are examined to see which one can give the best match to a block to be coded. For example, if a full-pixel resolution motion vector is (3, 5), half-pixel resolution motion vectors surrounding this full-pixel resolution motion vector, i.e., (2.5, 5), (3.5, 5), (2.5, 4.5), (3, 4.5), (3.5, 4.5), (2.5, 5.5), (3, 5.5) and (3.5, 5.5), are examined to see which one can give the best match to a block to be coded. If the best match of a half-pixel resolution motion vector is better than that given by the full-pixel resolution motion vector, the half-pixel resolution motion vector is outputted from the half-pixel MV estimation circuit 4 together with the block to be coded. Otherwise, the full-pixel resolution motion vector is outputted from the half-pixel MV estimation circuit 4 together with the block to be coded.

The motion vectors (full-pixel or half-pixel resolution motion vectors) obtained in the motion vector estimation process are passed, together with the blocks to be coded, through a line 56 to a motion compensation circuit 5 which performs motion compensation using the blocks stored in the local decoded frame memory 14 as reference blocks. If the motion vector is the half-pixel resolution motion vector, frame-based or field-based interpolation process is performed depending on whether or not the absolute magnitude of the horizontal component of the half-pixel resolution motion vector is greater than a pre-defined threshold, similar to the process in the interpolation unit 21, by using the reference block read from the local decoded frame memory 14 to obtain a predicted block. If the motion vector is the full-pixel resolution motion vector, no interpolation is needed and the reference block read from the local decoded frame memory 14 is used as a predicted block. Differences between values of the pixels of the block to be coded and values of the pixels of the predicted block are computed to obtain a differential block composed of the difference values. Based on the differential block, the motion compensation circuit 5 also determines whether the block to be coded should be motion compensated or not by comparing the activity of the block to be coded and the differential block using some pre-defined criteria, such as standard deviation of the blocks. If the block to be coded is decided to be motion compensated, its differential block is passed through a line 32 to the DCT circuit 6. If the block to be coded is decided not to be motion compensated, the block itself (i.e., the original block outputted from the block sampling circuit 2) is passed through the line 32 to the DCT circuit 6 (which is the same as the block of the intra-coded frame). Further, the motion compensation circuit 5 produces an information bit indicating whether a block is coded with motion compensation or not, and passes the information bit together with the motion vector to the DCT circuit 6. That is, the data outputted from the motion compensation circuit 5 through the line 32 to the DCT circuit 6 are either the differential block (coded with motion compensation) or the original block (coded without motion compensation), the information bit indicating whether or not the block is coded with motion compensation, and either the full-pixel resolution motion vector or the half-pixel resolution motion vector.

The block data from the motion compensation circuit 5 are transformed to DCT coefficients in the DCT circuit 6, and the DCT coefficients are quantized in the quantization circuit 7 to be quantized DCT coefficients. The information bits each indicating whether or not a block is coded with motion compensation and the motion vectors are passed through the DCT circuit 6 and the quantization circuit 7 to the line 33. The quantized data (quantized DCT coefficients), together with side information including the quantization step, the motion vectors and the information bits each indicating whether or not motion compensation is done to a block, are passed through the line 33 to the run-length coding & variable length coding circuit 8 to be subjected to run-length coding and variable length coding to become the output coded bit stream 29. The bit stream is also passed through the line 23 to the rate controller 9. The quantized data from the quantization circuit 7 is also passed through the line 24 to be subjected to inverse quantization in the inverse quantization circuit 16, inverse DCT in the inverse DCT circuit 15 and stored in the local decoded frame memory 14 for the encoding of the next frame.

Figure 4:
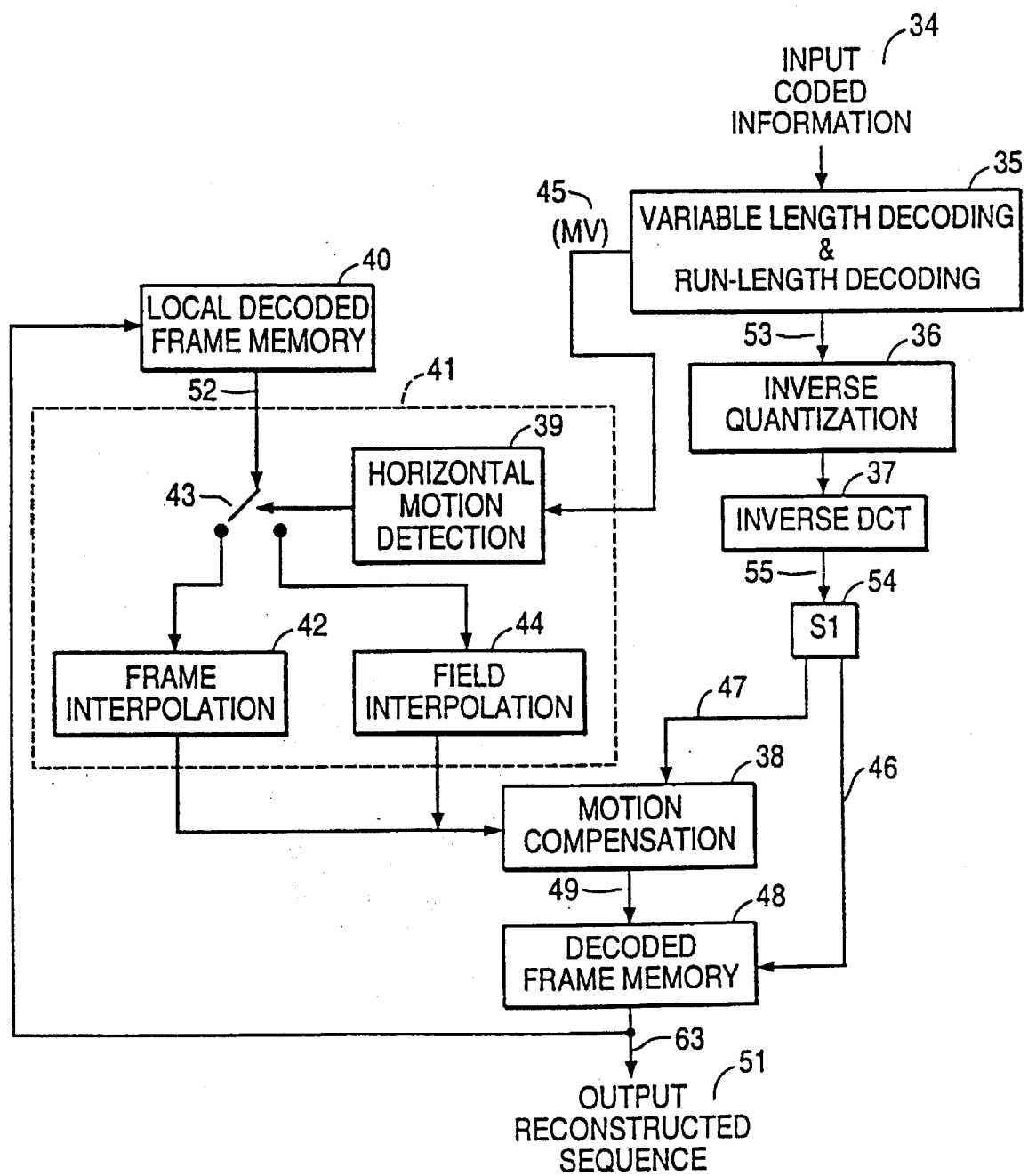
FIG. 4 is a block diagram of a decoder embodying the present invention.

A video signal decoding apparatus embodying the present invention is shown in FIG. 4.

In this embodiment, input coded information 34, which is the encoded video bit stream transmitted from the encoder, is inputted to a variable length decoding & run-length decoding circuit 35 which demultiplexes and decodes the variable length codes to produce the quantized coefficients of each block of the coded frame and the side information of the block, i.e., the motion vector, quantization step and the information bit indicating whether the block is motion compensated or not. The variable length decoding & run-length decoding circuit 35 also checks the frame number of the frame to be decoded to see whether the frame is intra-coded or predictive-coded. The decoded quantized coefficient block is passed through a line 53 to an inverse quantization circuit 36 to be subjected to an inverse quantization process and then to an inverse discrete cosine transform (inverse DCT) circuit 37 to be subjected to an inverse discrete cosine transformation (inverse DCT) process. The output of the inverse DCT circuit, which is a sequence of blocks of pixel data, is passed through a line 55 to a switch (S1) 54. Also, the side information obtained in the variable length decoding & run-length decoding circuit 35 is passed through the line 53, the inverse quantization circuit 36, the inverse DCT circuit 37 and the line 55 to the switch 54.

The switch 54 checks the frame number and, if the frame to be decoded is an intra-coded frame, sends the output of the inverse DCT circuit 37 directly to a decoded frame memory 48 through a line 46. The data stored in the decoded frame memory 48 is then outputted as an output reconstructed sequence 51 through an output line 63. The output reconstructed sequence is sent also to a local decoded frame memory 40 through a line 50 for motion compensation of the next frame.

If the frame to be decoded is a predictive-coded frame, the switch 54 checks the information bit indicating whether a block is coded with motion compensation or not and, if the block outputted from the inverse DCT circuit 37 is coded without motion compensation, sends the block directly to the decoded frame memory 48. The data stored in the decoded frame memory 48 is then outputted as an output reconstructed sequence 51 through the output line 63, and is sent also to the local decoded frame memory 40 through the line 50 for motion compensation of the next frame.

If the block outputted from the inverse DCT circuit 37 is coded with motion compensation, it is the differential block and a predicted block has to be obtained through a frame or field interpolation process performed in an interpolation unit 41 and a motion compensation performed in a motion compensation circuit 38. In this case, the switch 54 sends the output of the inverse DCT circuit 37 to the motion compensation circuit 38. On the other hand, the motion vector obtained in the variable length decoding & run-length decoding circuit 35 is sent through a line 45 to a horizontal motion detection circuit 39 in the interpolation unit 41. The horizontal motion detection circuit 39 examines the magnitude of the horizontal vector to see whether it is greater or less than the pre-defined threshold. According to the examination result, the horizontal motion detection circuit 39 controls a switch 43 to select a frame interpolation process or a field interpolation process. If the magnitude of the horizontal motion vector is greater than the pre-defined threshold, the switch 43 sends the data stored in the local decoded frame memory 40 to a frame interpolation circuit 42. Otherwise, the switch 43 sends the data stored in the local decoded frame memory 40 to a field interpolation circuit 44. The frame interpolation circuit 42 performs a frame interpolation process using the data from the local decoded frame memory 40 to obtain the predicted block. The field interpolation circuit 44 performs a field interpolation process using the data from the local decoded frame memory 40 to obtain the predicted block. The motion compensation circuit 38 adds the difference block to the predicted block outputted from the interpolation circuit 42 or 44 to produce a reconstructed block. This reconstructed block is passed through a line 49 to the decoded frame memory 40. The reconstructed blocks of the frame stored in the decoded frame memory are outputted as the output reconstructed sequence 51 and also sent to the local decoded frame memory 40 for motion compensation of the next frame.

What is claimed is:

1. A method of coding an interlaced scan digital video signal comprising the steps of:

partitioning each frame of an input of said interlaced scan digital video signal into blocks of pixel data;

determining whether each frame is to be intra-coded or predictive-coded;

producing a full-pixel resolution motion vector of a block of a first frame which has been determined to be predictive-coded with reference to a reference frame;

checking the full-pixel resolution motion vector to determine whether said block of said first frame is to be compensated using a frame-based interpolation process or a field-based interpolation process;

subjecting said block of said first frame to only one of said frame-based interpolation process or said field-based interpolation process in accordance with whether said block is determined in said checking step to be compensated using said frame-based interpolation process or said field-based interpolation process respectively to obtain a sub-pixel resolution block;

subjecting said sub-pixel resolution block to motion estimation and compensation to obtain a predicted block; and coding each block of a second frame which has been determined to be intra-coded and said predicted block to obtain a coded bit stream.

2. A method of coding an interlaced scan digital video signal comprising the steps of:

partitioning each frame of an input of said interlaced scan digital video signal into blocks of pixel data;

determining whether each frame is to be intra-coded or predictive-coded;

producing a full-pixel resolution motion vector of a block of a first frame which has been determined to be predictive-coded with reference to a reference frame;

checking the full-pixel resolution motion vector to determine whether said block of said first frame is to be compensated using a frame-based interpolation process or a field-based interpolation process;

subjecting said block of said first frame to only one of said frame-based interpolation process or said field-based interpolation process in accordance with whether said block is determined in said checking step to be compensated using said frame-based interpolation process or said field-based interpolation process respectively to obtain a sub-pixel resolution block;

subjecting said sub-pixel resolution block to motion estimation and compensation to obtain a predicted block; and coding each block of a second frame which has been determined to be intra-coded and said predicted block to obtain a coded bit stream, wherein said full-pixel resolution motion vector checking step includes checking a magnitude of a horizontal component of said full-pixel resolution motion vector, and determining that said block is to be compensated using said frame-based interpolation process if said magnitude is less than a predetermined threshold and that said block is to be compensated using said field-based interpolation process if said magnitude is greater than said predetermined threshold.

3. A method according to claim 1, wherein said coding step comprises the steps of:

discrete cosine transforming each of said blocks into discrete cosine transform coefficients;

quantizing said coefficients to obtain quantized coefficients;

run-length coding said quantized coefficients to obtain run-length coded data; and variable length coding said run-length coded data to obtain said coded bit stream.

4. A method of decoding a coded bit stream which has been obtained by compression coding an interlaced scan digital video signal, comprising the steps of:

decoding the coded bit stream to reproduce a differential block of pixel data and a motion vector;

checking said motion vector to decide whether said differential block is to be compensated using a frame-based interpolation process or a field-based interpolation process;

subjecting said differential block to only one of said frame-based interpolation process or said field-based interpolation process in accordance with whether said block is determined in said checking step to be compensated using said frame-based interpolation process or said field-based interpolation process respectively to reproduce a predicted block; and adding said differential block to said predicted block to obtain a motion compensated reconstructed block that is a block of pixels of said digital video signal.

5. A method according to claim 4, wherein said motion vector checking step includes checking a magnitude of a horizontal component of said motion vector, and determining that said differential block is to be compensated using said frame-based interpolation process if said magnitude is less than a predetermined threshold and that said block is to be compensated using said field-based interpolation process if said magnitude is greater than said predetermined threshold.

6. A method according to claim 4, wherein said decoding step comprises the steps of:

subjecting said coded bit stream to variable length decoding and run-length decoding to reproduce quantized discrete cosine transform coefficients;

inverse quantizing said coefficients to reproduce discrete cosine transform coefficients; and inverse discrete cosine transforming said discrete cosine transform coefficients to obtain said differential block of pixel data.

7. A method according to claim 2, wherein said coding step comprises the steps of:

discrete cosine transforming each of said blocks into discrete cosine transform coefficients;

quantizing said coefficients to obtain quantized coefficients;

run-length coding said quantized coefficients to obtain run-length coded data; and variable length coding said run-length coded data to obtain said coded bit stream.

8. A method according to claim 5, wherein said decoding step comprises the steps of:

subjecting said coded bit stream to variable length decoding and run-length decoding to reproduce quantized discrete cosine transform coefficients;

inverse quantizing said coefficients to reproduce discrete cosine transform coefficients; and inverse discrete cosine transforming said discrete cosine transform coefficients to obtain said differential block of pixel data.

9. An apparatus for coding an interlaced scan digital video signal comprising:

block sampling means for partitioning each frame of an input of said interlaced scan digital video signal into blocks of pixel data;

switch means for designating each frame as a frame to be intra-coded or a frame to be predictive-coded;

motion vector estimation means for producing a full-pixel resolution motion vector of a block of a first frame which has been determined to be predictive-coded with reference to a reference frame;

detection means for checking the full-pixel resolution motion vector to determine whether said block of said first frame is to be compensated using a frame-based interpolation process or a field-based interpolation process;

interpolation means for subjecting said block of said first frame to only one of said frame-based interpolation process or said field-based interpolation process in accordance with whether said block is determined by said detection means to be compensated using said frame-based interpolation process or said field-based interpolation process respectively to obtain a sub-pixel resolution block;

motion compensation means for subjecting said sub-pixel resolution block to motion estimation and compensation to obtain a predicted block; and coding means for coding each block of a second frame which has been determined to be intra-coded and said predicted block to obtain a coded bit stream.

10. An apparatus for coding an interlaced scan digital video signal comprising:

block sampling means for partitioning each frame of an input of said interlaced scan digital video signal into blocks of pixel data;

switch means for designating each frame as a frame to be intra-coded or a frame to be predictive-coded;

motion vector estimation means for producing a full-pixel resolution motion vector of a block of a first frame which has been determined to be predictive-coded with reference to a reference frame;

detection means for checking the full-pixel resolution motion vector to determine whether said block of said first frame is to be compensated using a frame-based interpolation process or a field-based interpolation process;

interpolation means for subjecting said block of said first frame to only one of said frame-based interpolation process or said field-based interpolation process in accordance with whether said block is determined by said detection means to be compensated using said frame-based interpolation process or said field-based interpolation process respectively to obtain a sub-pixel resolution block;

motion compensation means for subjecting said sub-pixel resolution block to motion estimation and compensation to obtain a predicted block; and coding means for coding each block of a second frame which has been determined to be intra-coded and said predicted block to obtain a coded bit stream;

wherein said detection means includes means for checking a magnitude of a horizontal component of said full-pixel resolution motion vector and determining that said block is to be compensated using said frame-based interpolation process if said magnitude is less than a predetermined threshold and that said block is to be compensated using said field-based interpolation process if said magnitude is greater than said predetermined threshold.

11. An apparatus according to claim 9, wherein said coding means comprises:

DCT means for discrete cosine transforming each of said blocks into discrete cosine transform coefficients;

quantizing means for quantizing said coefficients to obtain quantized coefficients; and run-length and variable length coding means for run-length coding said quantized coefficients to obtain run-length coded data, and variable length coding said run-length coded data to obtain said coded bit stream.

12. An apparatus for decoding a coded bit stream which has been obtained by compression coding an interlaced scan digital video signal, comprising the steps of:

decoding means for decoding the coded bit stream to reproduce a differential block of pixel data and a motion vector;

detection means for checking said motion vector to decide whether said differential block is to be compensated using a frame-based interpolation process or a field-based interpolation process;

interpolation means for subjecting said differential block to only one of said frame-based interpolation process or said field-based interpolation process in accordance with whether said block is determined by said detection means to be compensated using said frame-based interpolation process or said field-based interpolation process respectively to reproduce a predicted block; and motion compensation means for adding said differential block to said predicted block to obtain a motion compensated reconstructed block that is a block of pixels of said digital video signal.

13. An apparatus according to claim 12, wherein said detection means includes means for checking a magnitude of a horizontal component of said motion vector, and for determining that said differential block is to be compensated using said frame-based interpolation process if said magnitude is less than a predetermined threshold and that said block is to be compensated using said field-based interpolation process if said magnitude is greater than said predetermined threshold.

14. An apparatus according to claim 12, wherein said decoding means comprises:

variable length and run length decoding means for subjecting said coded bit stream to variable length decoding and run-length decoding to reproduce quantized discrete cosine transform coefficients;

inverse quantizing means for inverse quantizing said coefficients to reproduce discrete cosine transform coefficients; and inverse DCT means for inverse discrete cosine transforming said discrete cosine transform coefficients to obtain said differential block of pixel data.

15. An apparatus according to claim 10, wherein said coding means comprises:

DCT means for discrete cosine transforming each of said blocks into discrete cosine transform coefficients;

quantizing means for quantizing said coefficients to obtain quantized coefficients; and run-length and variable length coding means for run-length coding said quantized coefficients to obtain run-length coded data, and variable length coding said run-length coded data to obtain said coded bit stream.

16. An apparatus according to claim 13, wherein said decoding means comprises:

variable length and run length decoding means for subjecting said coded bit stream to variable length decoding and run-length decoding to reproduce quantized discrete cosine transform coefficients;

inverse quantizing means for inverse quantizing said coefficients to reproduce discrete cosine transform coefficients; and inverse DCT means for inverse discrete cosine transforming said discrete cosine transform coefficients to obtain said differential block of pixel data.

* * * * *